US008660215B2

(12) United States Patent
Hogan

(10) Patent No.: US 8,660,215 B2
(45) Date of Patent: Feb. 25, 2014

(54) DECODING ALGORITHM FOR FREQUENCY SHIFT KEY COMMUNICATIONS

(75) Inventor: Brian Joseph Hogan, Temecula, CA (US)

(73) Assignee: Siemens Rail Automation Corporation, Louisville, KY (US)

( * ) Notice: Subject to any disclaimer, the term of this patent is extended or adjusted under 35 U.S.C. 154(b) by 573 days.

(21) Appl. No.: 12/724,800

(22) Filed: Mar. 16, 2010

(65) Prior Publication Data

US 2011/0228882 A1 Sep. 22, 2011

(51) Int. Cl.
*H03D 3/00* (2006.01)
*H04L 27/14* (2006.01)

(52) U.S. Cl.
USPC ........... 375/334; 375/272; 375/335; 375/336; 375/329; 375/330; 329/300

(58) Field of Classification Search
USPC ................. 375/272, 334, 335, 336, 329, 330; 329/300
See application file for complete search history.

(56) References Cited

U.S. PATENT DOCUMENTS 2,106,682 A 1/1938 Field et al.
2,719,218 A 9/1955 Miller
3,268,723 A 8/1966 Failor et al.
3,610,920 A 10/1971 Frielinghaus
3,966,149 A 6/1976 Matty et al.
4,015,082 A 3/1977 Matty et al.
4,065,081 A 12/1977 Huffman et al.
4,172,576 A 10/1979 Svet, Jr. et al.
4,324,376 A 4/1982 Kuhn
4,498,650 A 2/1985 Smith et al.
4,582,279 A 4/1986 Pontier
4,723,739 A 2/1988 Franke
4,737,968 A 4/1988 Norton et al.
4,752,742 A * 6/1988 Akaiwa .......................... 329/302
4,855,737 A 8/1989 Poole
4,868,864 A * 9/1989 Tjahjadi et al. ............ 379/93.32
5,029,780 A 7/1991 Peel
5,309,113 A * 5/1994 Mimura et al. ............... 329/302
5,398,894 A 3/1995 Pascoe
5,453,715 A * 9/1995 Lee ............................... 329/302

(Continued)

FOREIGN PATENT DOCUMENTS

CA 1149918 7/1983
CN 1491846 4/2004

(Continued)

OTHER PUBLICATIONS

English language abstract of TW 455553, published Sep. 21, 2001.
English language abstract of JP 11-020702, published Jan. 26, 1999.
English language abstract of JP 2006-327290, published Dec. 7, 2006.
Machine English language translation of JP 2006-327290, published Dec. 7, 2006.

(Continued)

*Primary Examiner* — Shuwang Liu
*Assistant Examiner* — Sung Ahn

(57) ABSTRACT

A method and apparatus for decoding binary frequency shift key signals in which an exclusive-OR of the sign of a real waveform with a sign of the imaginary waveform at a time shortly after the real (or, alternatively, the imaginary) waveform crosses zero is used to determine a bit represented by the signal. In some embodiments, particularly those in which the bit period is about one-half of the carrier signal frequency, both the real and imaginary waveforms are monitored to detect the zero crossing in order to account for the situation in which data transitions prevent zero-crossings on one of the waveforms.

12 Claims, 5 Drawing Sheets

(56) References Cited

U.S. PATENT DOCUMENTS

| | | | | |
|---|---|---|---|---|
| 5,469,112 | A | 11/1995 | Lee | |
| 5,553,064 | A * | 9/1996 | Paff et al. | 370/478 |
| 5,554,982 | A | 9/1996 | Shirkey et al. | |
| 5,590,855 | A | 1/1997 | Kato et al. | |
| 5,633,895 | A * | 5/1997 | Powell et al. | 375/324 |
| 5,640,428 | A * | 6/1997 | Abe et al. | 375/334 |
| 5,720,454 | A | 2/1998 | Bachetti et al. | |
| 5,739,768 | A | 4/1998 | Lane et al. | |
| 5,864,304 | A | 1/1999 | Gerszberg et al. | |
| 5,890,682 | A | 4/1999 | Welk | |
| 5,954,299 | A | 9/1999 | Pace | |
| 6,011,508 | A | 1/2000 | Perreault et al. | |
| 6,011,816 | A * | 1/2000 | Sanielevici et al. | 375/324 |
| 6,025,789 | A | 2/2000 | Lane et al. | |
| 6,097,768 | A * | 8/2000 | Janesch et al. | 375/330 |
| 6,145,792 | A | 11/2000 | Penza | |
| 6,179,252 | B1 | 1/2001 | Roop et al. | |
| 6,218,961 | B1 | 4/2001 | Gross et al. | |
| 6,220,552 | B1 | 4/2001 | Ireland | |
| 6,396,869 | B1 * | 5/2002 | Park et al. | 375/146 |
| 6,572,056 | B2 | 6/2003 | Berry et al. | |
| 6,823,026 | B2 | 11/2004 | Mueller et al. | |
| 6,830,224 | B2 | 12/2004 | Lewin et al. | |
| 7,017,864 | B2 | 3/2006 | McAllister | |
| 7,098,774 | B2 | 8/2006 | Davenport et al. | |
| 7,254,467 | B2 | 8/2007 | Fries et al. | |
| 7,523,893 | B2 | 4/2009 | Francis et al. | |
| 7,575,202 | B2 | 8/2009 | Sharkey et al. | |
| 7,618,010 | B2 | 11/2009 | Fries | |
| 7,733,991 | B2 * | 6/2010 | Ryter | 375/343 |
| 7,832,691 | B2 | 11/2010 | Reibeling et al. | |
| 2004/0181321 | A1 | 9/2004 | Fries et al. | |
| 2007/0084974 | A1 | 4/2007 | Sharkey et al. | |
| 2008/0101481 | A1 | 5/2008 | Al-Eidan | |

FOREIGN PATENT DOCUMENTS

| | | |
|---|---|---|
| DE | 10 2004 057459 | 6/2006 |
| EP | 0 165 048 | 12/1985 |
| EP | 0 878 373 | 11/1998 |
| EP | 1338492 | 8/2003 |
| GB | 1546942 | 5/1979 |
| JP | 11020702 | 1/1999 |
| JP | 2006168382 | 6/2006 |
| JP | 2006327290 | 12/2006 |
| JP | 2008-137400 | 6/2008 |
| KR | 10-2003-0011127 | 2/2003 |
| KR | 10-2004-0060261 | 7/2004 |
| KR | 10-2004-0106864 | 12/2004 |
| KR | 10-2009-0104379 | 10/2009 |
| TW | 455553 | 9/2001 |
| WO | WO 91/11356 | 8/1991 |
| WO | WO 2004/071839 | 8/2004 |

OTHER PUBLICATIONS

English language abstract of JP 2006-168382, published Jun. 29, 2006.

Machine English language translation of JP 2006-168382, published Jun. 29, 2006.

English language abstract of SU 1592204, published Sep. 15, 1990.

"How Railroad Crossing Signals Work", http://matt.zont.org/signals/crossing/xngworks/xngworks/html, last revised Jan. 10, 2007, 28 pages.

English language abstract of DE 10 2004 057459, Published Jun. 1, 2006.

Machine English language translation of DE 10 2004 057459, Published Jun. 1, 2006.

Crawford E. Staples, AFO Can Solve Highway Crossing Problems, Railway Signaling and Communications, vol. 52, pp. 20-26 (Sep. 1964).

International Search Report issued in International Application No. PCT/US2010/042475, mailed Feb. 8, 2011.

Written Opinion issued in International Application No. PCT/US2010/042475, mailed Feb. 8, 2011.

English language abstract of JP 2008-137400, published Jun. 19, 2008.

Machine English language translation of JP 2008-137400, published Jun. 19, 2008.

English language abstract of KR 10-2009-0104379, published Oct. 6, 2009.

English language abstract of KR 10-2004-0106864, published Dec. 18, 2004.

English language abstract of KR 10-2003-0011127, published Feb. 6, 2003.

English language abstract of KR 10-2004-0060261, published Jul. 6, 2004.

GE Transportation ElectroLogIXS XP4: For Crossing Prediction, 2 pgs, believed to be published before Mar. 2, 2010.

Engelbrecht, Roelof J., "The Effect of Variation in Railroad Warning Time on Traffic Signal Preemption," Texas Transportation Institute, pp. 1-19, believed to be published before Mar. 2, 2010.

Victrack Access, "Low Cost Level Cross Warning Device," pp. 1-14, First Release, Jun. 6, 2008.

C3 Trans Systems LLC, "New Crossing Technology, Model HRI 2000: Improved Grade Crossing Warning System," 2 pages, 2004.

Russel, Michael, "High-Speed Rail Program: Integrated Quad Gate Crossing Control System," IDEA, Transportation Research Board, National Research Council, pp. 1-28, Dec. 2001.

Li, Meng et al., "Analysis Toward Mitigation of Congestion and Conflicts at Light Rail Grade Crossings and Intersections," California PATH Research Report, UCB-ITS-PRR-2009-9, Final Report for Task Order 5407, pp. 1-55, Jan. 2009.

http://www.southbaysignal.com/crossing.htm, South Bay Signal LLC, Grade Crossing Warning Systems, printed Apr. 20, 2010.

U.S. Appl. No. 12/839,231.

* cited by examiner

DECODING ALGORITHM FOR FREQUENCY SHIFT KEY COMMUNICATIONS

BACKGROUND

Track circuits are used in the railroad industry to detect the presence of a train in a block of track. An AC overlay track circuit includes a transmitter and a receiver, with the transmitter configured to transmit an AC signal through the track rails at one end of a block of track and the receiver connected to the rails at the other end of the block and configured to detect the signal. Other than the connection through the track rails, there is typically no connection between the transmitter and receiver for a block. When a train is present in a block of track monitored by a track circuit, the train shunts, or shorts, the two rails, with the result that no signal is received at the receiver. Thus, the receiver uses the presence or absence of a detected signal to indicate whether or not a train is present in the block. It is therefore very important that a receiver in a particular block of interest not interpret spurious signals or stray signals from a transmitter in another block of track or some other transmitter as originating from the transmitter associated with the block of interest.

In order to prevent a spurious signal detected at the receiver from being mistakenly interpreted as originating from the transmitter, transmitters are typically configured to transmit at one of a plurality of fixed frequencies, and personnel responsible for installing the track circuits ensure that all track circuits in close spatial proximity are configured to transmit on different frequencies. In order to provide further assurance that a detected signal originates from a corresponding transmitter, the signal is modulated by a code. In some track circuits, the modulation is performed using a binary frequency shift key technique. With this technique, frequencies above or below the nominal center frequency are transmitted to convey a bit of information (i.e., a frequency above the nominal center frequency represents a logical "1" while a frequency below the nominal center frequency represents a logical "0"). What is needed is a method of reliably detecting these codes. Because there is typically no connection between the transmitter and receiver for a track block, a non-coherent detection method must be used.

DETAILED DESCRIPTION

In the following detailed description, a plurality of specific details, such as transmission frequencies and track circuit types, are set forth in order to provide a thorough understanding of the preferred embodiments discussed below. The details discussed in connection with the preferred embodiments should not be understood to limit the present inventions. Furthermore, for ease of understanding, certain method steps are delineated as separate steps; however, these steps should not be construed as necessarily distinct nor order dependent in their performance.

Figure 1:
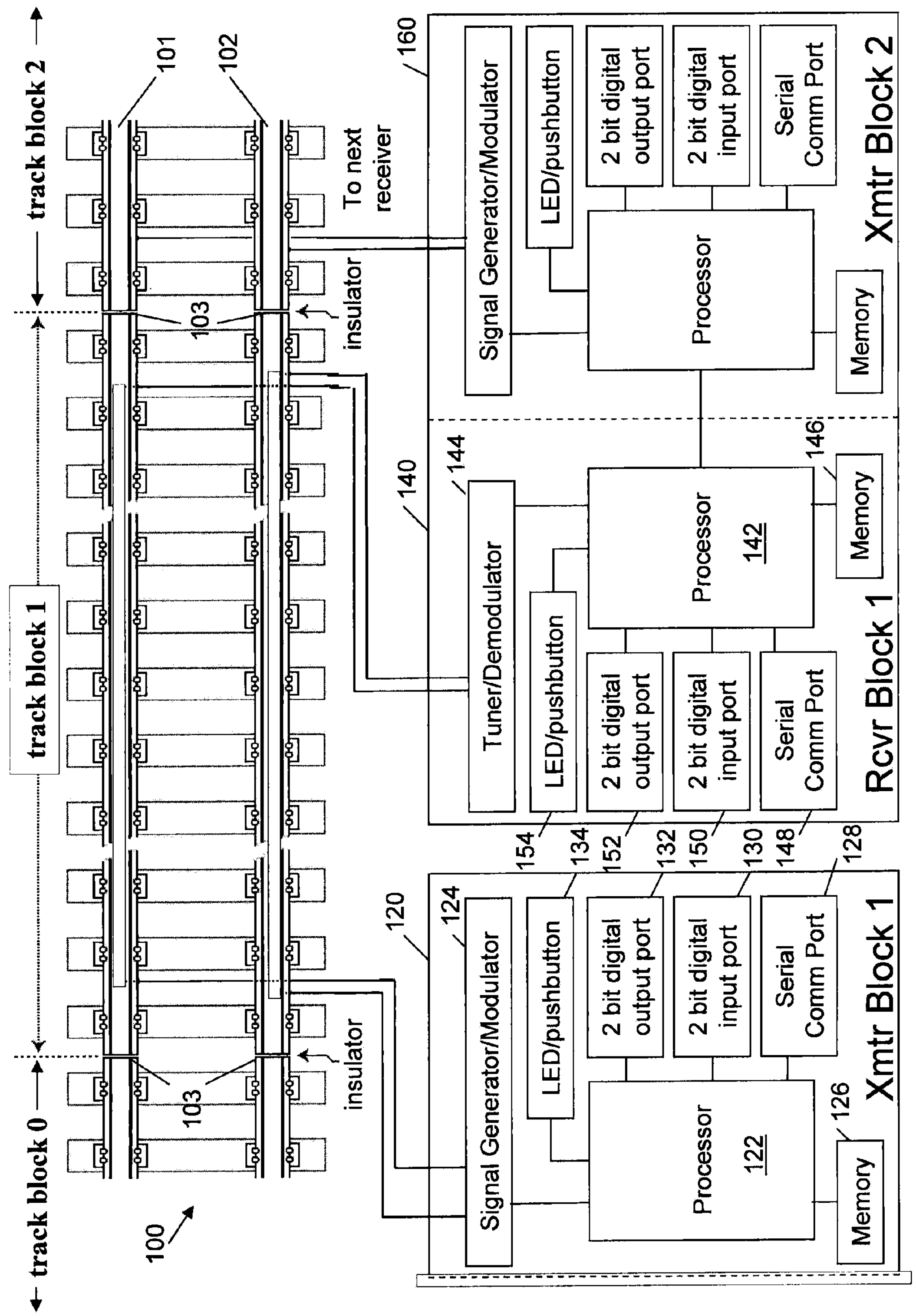
FIG. 1 is a schematic diagram of a receiver and transmitter attached to train tracks according to one embodiment.

FIG. 1 illustrates a track 100 divided into three blocks 0, 1 and 2. The track includes two rails 101, 102. FIG. 1 illustrates insulators 103 at the boundaries of block 1, but it should be understood that the insulators 103 are not necessary and are not present in some embodiments. A transmitter 120 is attached to the rails 101, 102 near one end of block 1, and a receiver 140 is attached to the rails 101, 102 near the opposite end. In practice, the transmitter 120 and the receiver 140 are placed as close to the end of a block as practicable when insulators 103 are present.

FIG. 1 illustrates the receiver 140 for block 1 attached to a transmitter 160 for block 2. As explained more fully in commonly owned co-pending U.S. provisional application Ser. No. 61/226,416, entitled "Track Circuit Communications," the receiver and transmitter for adjacent block are often collocated because the end of one block is immediately adjacent to the start of another block. FIG. 1 also illustrates a transmitter 120 for block 1, which may be attached to a receiver for block 0 (not shown in FIG. 1).

The transmitter 120 is controlled by a processor 122, which is connected to a memory 126, a serial communications port 128, two 2-bit digital ports 130, 132 and an LED/pushbutton assembly 134. One of the two bit ports 130 is configured for output and the other two bit port 132 is configured for input in this embodiment. As discussed in the aforementioned commonly owned provisional application, the transmitter can accept digital data via the port 128 or 130 to be transmitted via the rails 101, 102. The transmitter may also transmit a fixed code stored in the memory 126. The processor 122 controls a signal generator/modulator 124 to generate a carrier signal at a desired frequency and modulate the carrier signal with digital data or a code using a binary frequency shift key (BFSK) modulation technique. Any conventional BFSK modulator may be employed.

The receiver 140 also includes a processor 142 connected to a memory 146. A tuner/demodulator 144 receives a BFSK signal transmitted via the rails by the transmitter 120 and demodulates the digital data or code carried by the signal. The tuner/demodulator will be discussed in further detail below. Also connected to the processor 142 is a serial communications port 148, two 2-bit digital input/output ports 150, 152 and an LED/pushbutton assembly 154. As discussed in the aforementioned commonly owned provisional application, information demodulated from the received signal may be output to another transmitter (e.g., the transmitter 160) for transmission to a subsequent block, or may be output to an attached wayside device such as a signal.

The tuner/demodulator 144 will now be explained in further detail with reference to the FIG. 2, which illustrates a tuner/demodulator circuit according to one embodiment. Track voltage is baseband sampled via a high speed analog-to-digital (A/D) converter 202 at data rate sufficient to satisfy the Nyquist criterion. In this example, the received signals may have a frequency as high as 20.2 kilohertz and the sample rate is set at 48 kHz. The samples are stored in an 18-bit register (not shown in FIG. 1) in some embodiments. This "raw" track data is first mixed at mixers 204, 206 with the quadrature components (i.e. cosine and sine) of a numerically controlled oscillator (NCO) 208, which is configured to generate a signal at the nominal center frequency expected from the transmitter 120 (which will be noncoherent in some embodiments as discussed above). The mixing of the raw track data with the output of the NCO 208 produces a signal with sum and difference components in a manner well known in the art. For example, if the nominal center frequency is 156

Hz, then the output of the mixer will be a signal that has a frequency component at approximately 312 Hz±2.4 Hz (the sum of the NCO signal of 156 Hz plus the signal detected on the track from the transmitter of 156 Hz±2.4 Hz) and a frequency component of approximately 2.4 Hz (the difference of the NCO signal of 156 Hz and the signal detected on the track from the transmitter of 156 Hz±2.4 Hz).

In some embodiments, the NCO 208 is clocked to produce frequencies ranging from a nominal low frequency of 156 Hz to a nominal high frequency of approximately 20.2 kHz. However, lower frequencies are preferable due to significant attenuation of higher frequency signals in the track rails, with frequencies in the audible range being used most commonly. In some embodiments, 16 distinct nominal frequencies in this range are utilized.

The actual frequency output by the NCO 208 is shifted up or down with respect to the nominal center frequency to represent a logical “1” or a logical “0.” For example, if the nominal center frequency is 156 Hz, a frequency of 158.6 Hz (156 Hz+2.4 Hz) represents a logical “1” whereas a frequency of 153.4 Hz (156 Hz-2.4 Hz) represents a logical “0”. The frequency shift is changed over time to represent individual bits in a multi-bit code. In some embodiments, the codes can be 8 bits long, but longer or shorter code lengths are also possible. In some embodiments, five distinct 8-bit codes (labeled A, C, D, E and F) out of the possible 256 8 bit codes are utilized.

Figure 3:
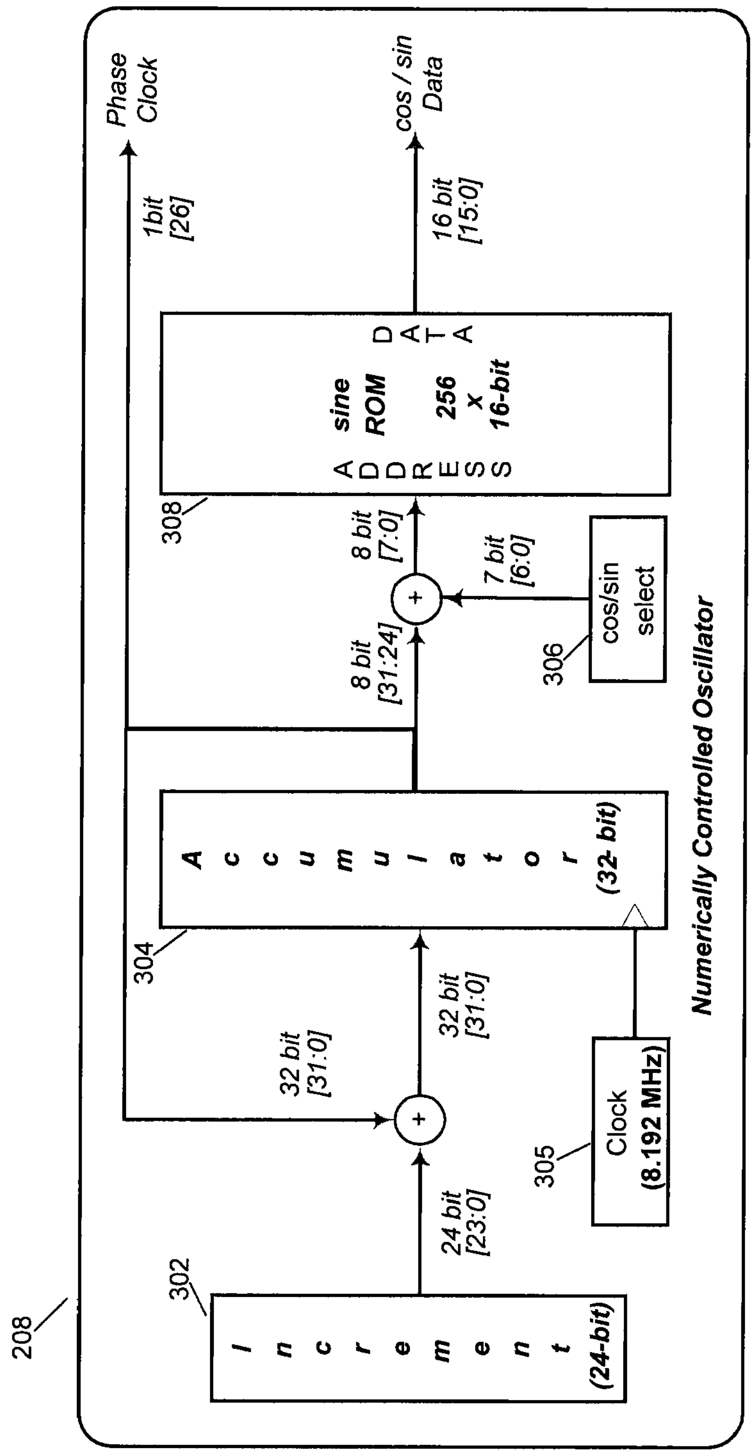
FIG. 3 is a block diagram of a numerically controlled oscillator of the tuner/demodulator of FIG. 2.

FIG. 3 illustrates the NCO 208 in greater detail. The NCO 208 is preferably of a type sometimes referred to as direct digital synthesis, or DDS. The NCO’s output frequency is controlled through an increment register 302, which may be written to by the processor 142 of FIG. 1. The value of the increment register determines how much the phase will change in each clock cycle. The value from the increment register 302 is summed with the previous phase value and input to a phase accumulator 304. The phase accumulator 304 is driven by a clock signal from the clock 305. The output of the phase accumulator 304 is fed back to the phase accumulator 304 and is also summed with the cos/sin select register 306. This value is then used as an index to select a value from the sine ROM 308, which is the output of the NCO 208.

Figure 2:
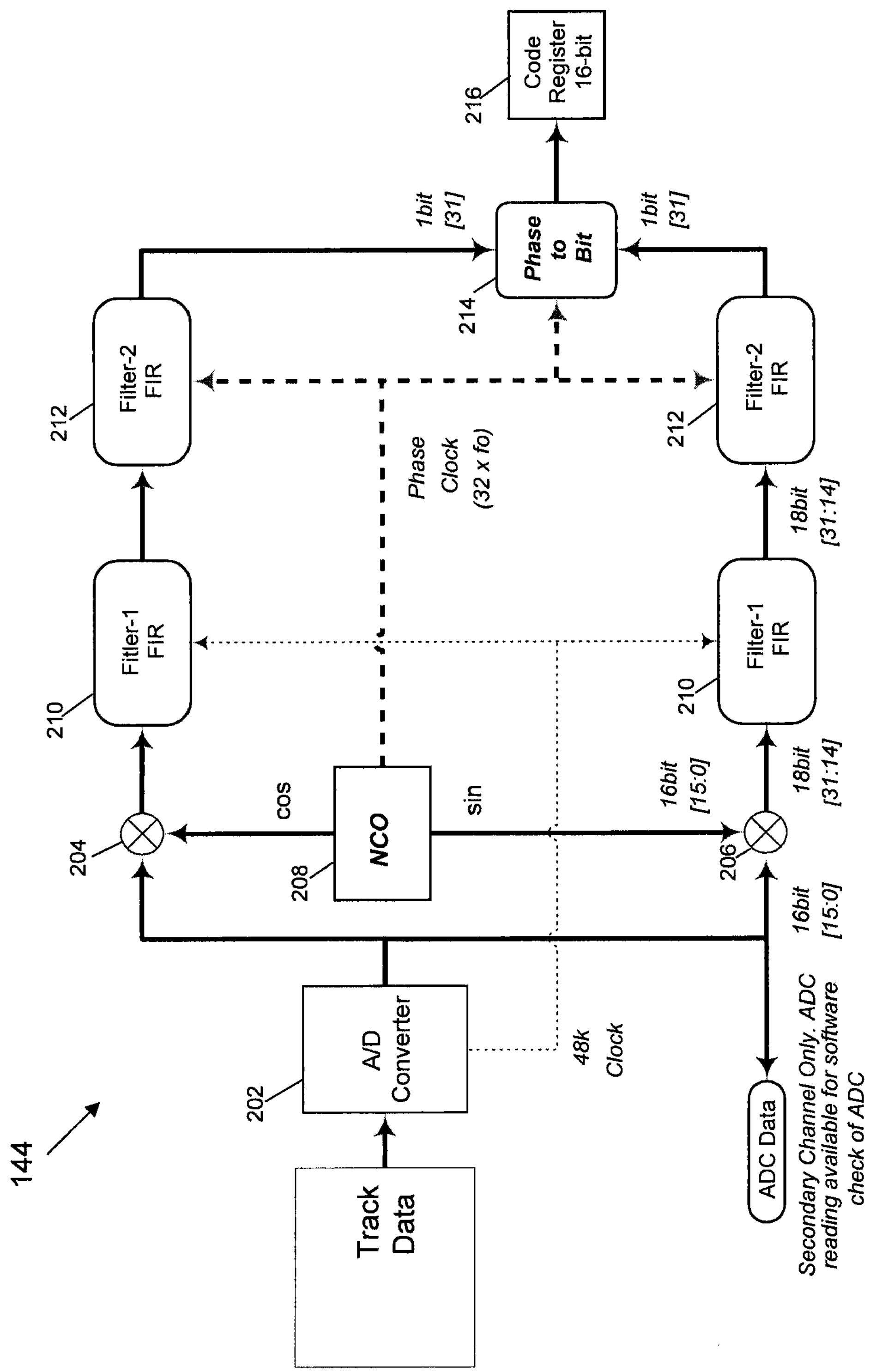
FIG. 2 is a block diagram of a tuner/demodulator of the receiver of FIG. 1.

Referring now back to FIG. 2, the mixed signal is then filtered in two stages to remove the sum frequency component such that only the difference component (i.e., the 2.4 Hz component) remains. The first filter 210 is a FIR low pass filter clocked at the ADC sample rate. The first filter 210 acts as an anti-aliasing filter for the second filter with a cutoff (3 dB point) frequency of approximately 20.2 kHz/64=315 Hz. The second filter 212 is clocked by the NCO’s address generator to provide 32 times the NCO’s programmed frequency $f_0$ (e.g., where the NCO frequency is 156 Hz, the second filter is clocked at 32×156=4,992 Hz, which is the Nyquist frequency for a 2,496 Hz signal). The second filter 212 is a FIR lowpass filter with a 3 dB frequency at the NCOs’ frequency divided by 64 and is designed to reject all frequencies above the difference frequency ($f_0$/64). The difference in frequency between the cutoff of the first filter (e.g., 315 Hz) and the Nyquist frequency of the second filter (e.g., 2,496 Hz) is sufficient bandwidth. Note the cutoff frequency tracks the programmed received frequency.

Figure 4:
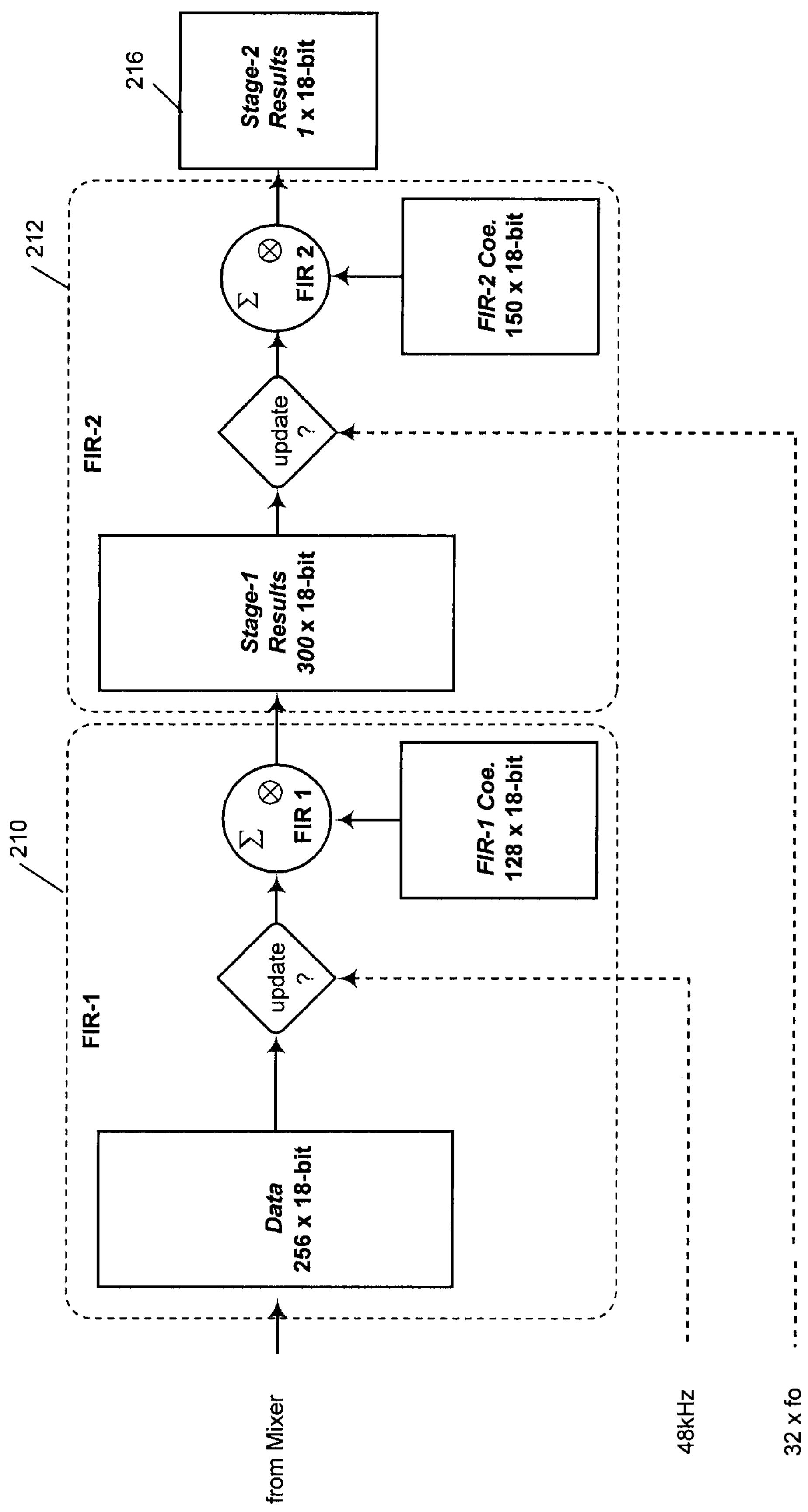
FIG. 4 is a block diagram of the filters of the tuner/demodulator of FIG. 2.

FIG. 4 illustrates the first and second filters 210, 212 in further detail to highlight memory allocation, bit width and processing. The coefficients for these filters are shown below in Table 1.

TABLE 1

| Filter Coefficients | | | | |
|---|---|---|---|---|
| | Filter 2 | | Filter 1 | |
| | Decimal | Hex | Decimal | Hex |
| 1 | 488 | 1E8 | −43 | FFFFFFD5 |
| 2 | 52 | 34 | −10 | FFFFFFF6 |
| 3 | 55 | 37 | −11 | FFFFFFF5 |
| 4 | 58 | 3A | −13 | FFFFFFF3 |
| 5 | 61 | 3D | −14 | FFFFFFF2 |
| 6 | 63 | 3F | −16 | FFFFFFF0 |
| 7 | 66 | 42 | −17 | FFFFFFEF |
| 8 | 70 | 46 | −19 | FFFFFFED |
| 9 | 73 | 49 | −21 | FFFFFFEB |
| 10 | 76 | 4C | −23 | FFFFFFE9 |
| 11 | 80 | 50 | −25 | FFFFFFE7 |
| 12 | 83 | 53 | −26 | FFFFFFE6 |
| 13 | 87 | 57 | −28 | FFFFFFE4 |
| 14 | 91 | 5B | −30 | FFFFFFE2 |
| 15 | 93 | 5D | −32 | FFFFFFE0 |
| 16 | 98 | 62 | −34 | FFFFFFDE |
| 17 | 102 | 66 | −36 | FFFFFFDC |
| 18 | 105 | 69 | −38 | FFFFFFDA |
| 19 | 110 | 6E | −40 | FFFFFFD8 |
| 20 | 114 | 72 | −42 | FFFFFFD6 |
| 21 | 118 | 76 | −44 | FFFFFFD4 |
| 22 | 122 | 7A | −45 | FFFFFFD3 |
| 23 | 126 | 7E | −47 | FFFFFFD1 |
| 24 | 131 | 83 | −49 | FFFFFFCF |
| 25 | 135 | 87 | −50 | FFFFFFCE |
| 26 | 140 | 8C | −52 | FFFFFFCC |
| 27 | 145 | 91 | −53 | FFFFFFCB |
| 28 | 149 | 95 | −54 | FFFFFFCA |
| 29 | 154 | 9A | −55 | FFFFFFC9 |
| 30 | 159 | 9F | −55 | FFFFFFC9 |
| 31 | 164 | A4 | −56 | FFFFFFC8 |
| 32 | 169 | A9 | −56 | FFFFFFC8 |
| 33 | 174 | AE | −56 | FFFFFFC8 |
| 34 | 179 | B3 | −56 | FFFFFFC8 |
| 35 | 185 | B9 | −55 | FFFFFFC9 |
| 36 | 190 | BE | −54 | FFFFFFCA |
| 37 | 195 | C3 | −53 | FFFFFFCB |
| 38 | 201 | C9 | −51 | FFFFFFCD |
| 39 | 206 | CE | −49 | FFFFFFCF |
| 40 | 212 | D4 | −47 | FFFFFFD1 |
| 41 | 218 | DA | −44 | FFFFFFD4 |
| 42 | 223 | DF | −40 | FFFFFFD8 |
| 43 | 229 | E5 | −36 | FFFFFFDC |
| 44 | 235 | EB | −32 | FFFFFFE0 |
| 45 | 241 | F1 | −27 | FFFFFFE5 |
| 46 | 247 | F7 | −22 | FFFFFFEA |
| 47 | 253 | FD | −16 | FFFFFFF0 |
| 48 | 259 | 103 | −9 | FFFFFFF7 |
| 49 | 265 | 109 | −2 | FFFFFFFE |
| 50 | 271 | 10F | 5 | 5 |
| 51 | 278 | 116 | 13 | D |
| 52 | 284 | 11C | 23 | 17 |
| 53 | 290 | 122 | 32 | 20 |
| 54 | 297 | 129 | 43 | 2B |
| 55 | 303 | 12F | 54 | 36 |
| 56 | 310 | 136 | 66 | 42 |
| 57 | 316 | 13C | 79 | 4F |
| 58 | 323 | 143 | 92 | 5C |
| 59 | 330 | 14A | 106 | 6A |
| 60 | 336 | 150 | 121 | 79 |
| 61 | 343 | 157 | 137 | 89 |
| 62 | 350 | 15E | 153 | 99 |
| 63 | 356 | 164 | 170 | AA |
| 64 | 363 | 16B | 188 | BC |
| 65 | 370 | 172 | 207 | CF |
| 66 | 377 | 179 | 226 | E2 |
| 67 | 384 | 180 | 246 | F6 |
| 68 | 390 | 186 | 267 | 10B |
| 69 | 397 | 18D | 289 | 121 |
| 70 | 404 | 194 | 311 | 137 |
| 71 | 411 | 19B | 334 | 14E |
| 72 | 418 | 1A2 | 358 | 166 |
| 73 | 425 | 1A9 | 383 | 17F |
| 74 | 432 | 1B0 | 408 | 198 |

TABLE 1-continued

| Filter Coefficients | | | | |
|---|---|---|---|---|
| | Filter 2 | | Filter 1 | |
| | Decimal | Hex | Decimal | Hex |
| 75 | 439 | 1B7 | 433 | 1B1 |
| 76 | 446 | 1BE | 460 | 1CC |
| 77 | 452 | 1C4 | 487 | 1E7 |
| 78 | 459 | 1CB | 514 | 202 |
| 79 | 466 | 1D2 | 542 | 21E |
| 80 | 473 | 1D9 | 571 | 23B |
| 81 | 480 | 1E0 | 600 | 258 |
| 82 | 487 | 1E7 | 630 | 276 |
| 83 | 494 | 1EE | 659 | 293 |
| 84 | 500 | 1F4 | 690 | 2B2 |
| 85 | 507 | 1FB | 720 | 2D0 |
| 86 | 514 | 202 | 751 | 2EF |
| 87 | 521 | 209 | 782 | 30E |
| 88 | 527 | 20F | 813 | 32D |
| 89 | 534 | 216 | 845 | 34D |
| 90 | 540 | 21C | 876 | 36C |
| 91 | 547 | 223 | 908 | 38C |
| 92 | 554 | 22A | 939 | 3AB |
| 93 | 560 | 230 | 971 | 3CB |
| 94 | 566 | 236 | 1002 | 3EA |
| 95 | 573 | 23D | 1034 | 40A |
| 96 | 579 | 243 | 1065 | 429 |
| 97 | 585 | 249 | 1096 | 448 |
| 98 | 591 | 24F | 1126 | 466 |
| 99 | 598 | 256 | 1157 | 485 |
| 100 | 604 | 25C | 1186 | 4A2 |
| 101 | 610 | 262 | 1216 | 4C0 |
| 102 | 615 | 267 | 1245 | 4DD |
| 103 | 621 | 26D | 1273 | 4F9 |
| 104 | 627 | 273 | 1301 | 515 |
| 105 | 633 | 279 | 1328 | 530 |
| 106 | 638 | 27E | 1354 | 54A |
| 107 | 644 | 284 | 1380 | 564 |
| 108 | 649 | 289 | 1404 | 57C |
| 109 | 655 | 28F | 1428 | 594 |
| 110 | 660 | 294 | 1451 | 5AB |
| 111 | 665 | 299 | 1473 | 5C1 |
| 112 | 670 | 29E | 1495 | 5D7 |
| 113 | 675 | 2A3 | 1515 | 5EB |
| 114 | 680 | 2A8 | 1534 | 5FE |
| 115 | 684 | 2AC | 1552 | 610 |
| 116 | 689 | 2B1 | 1568 | 620 |
| 117 | 694 | 2B6 | 1584 | 630 |
| 118 | 698 | 2BA | 1599 | 63F |
| 119 | 702 | 2BE | 1612 | 64C |
| 120 | 707 | 2C3 | 1624 | 658 |
| 121 | 711 | 2C7 | 1634 | 662 |
| 122 | 715 | 2CB | 1644 | 66C |
| 123 | 718 | 2CE | 1652 | 674 |
| 124 | 722 | 2D2 | 1659 | 67B |
| 125 | 726 | 2D6 | 1664 | 680 |
| 126 | 729 | 2D9 | 1668 | 684 |
| 127 | 733 | 2DD | 1671 | 687 |
| 128 | 736 | 2E0 | 1672 | 688 |
| 129 | 739 | 2E3 | | |
| 130 | 742 | 2E6 | | |
| 131 | 745 | 2E9 | | |
| 132 | 747 | 2EB | | |
| 133 | 750 | 2EE | | |
| 134 | 752 | 2F0 | | |
| 135 | 755 | 2F3 | | |
| 136 | 757 | 2F5 | | |
| 137 | 759 | 2F7 | | |
| 138 | 761 | 2F9 | | |
| 139 | 762 | 2FA | | |
| 140 | 764 | 2FC | | |
| 141 | 765 | 2FD | | |
| 142 | 767 | 2FF | | |
| 143 | 768 | 300 | | |
| 144 | 769 | 301 | | |
| 145 | 770 | 302 | | |
| 146 | 771 | 303 | | |
| 147 | 771 | 303 | | |
| 148 | 772 | 304 | | |
| 149 | 772 | 304 | | |
| 150 | 772 | 304 | | |

As discussed above, the output of the second filter 212 is the difference frequency. This output undergoes phase-to-bit processing 214, which correlates the phase of the quadrature signals to a bit (either high or low) and then updates a circular buffer 216 containing the most recent 16 bits received. The phase-to-bit processing may be performed by the processor 142 of FIG. 1, or a separate logic unit which may be realized using a microprocessor, a digital signal processor, a programmable logic unit (e.g., a field programmable gate array), hard-wired logic, or any other method known in the art.

The inventors have observed that the output of the mixers (i.e. the real and imaginary data) shift phase when a frequency shift occurs. In other words, when "high" frequency (representing a "1") is received, the real signal leads the imaginary signal; but when the low frequency signal (representing a "0") is received, the real signal lags the imaginary signal. The detection algorithm below takes advantage of this fact by determining whether the real signal is leading or lagging the imaginary signal to determine whether a logic 1 or 0 has been transmitted. This is a fundamentally different approach than that used in BFSK receivers of the type which employ two bandpass filters matched to the high and low frequencies, respectively, to determine whether a logic 0 or 1 has been transmitted.

In some embodiments, particularly those in which one or more full periods of the difference frequency are transmitted before a frequency shift can occur, it is a relatively simple matter to determine whether the real signal leads the imaginary signal. Indeed, a simple and elegant algorithm for doing this is to wait until the real signal changes sign (i.e., when the real waveform crosses the x axis), and then do an exclusive-or between the sign of the real signal and the sign of the imaginary signal after the zero crossing but prior to 90 degrees or one-fourth of the period of the difference frequency. The result will be a logic 0 when the real signal is lagging and a logic 1 when the real signal is leading.

Figure 5:
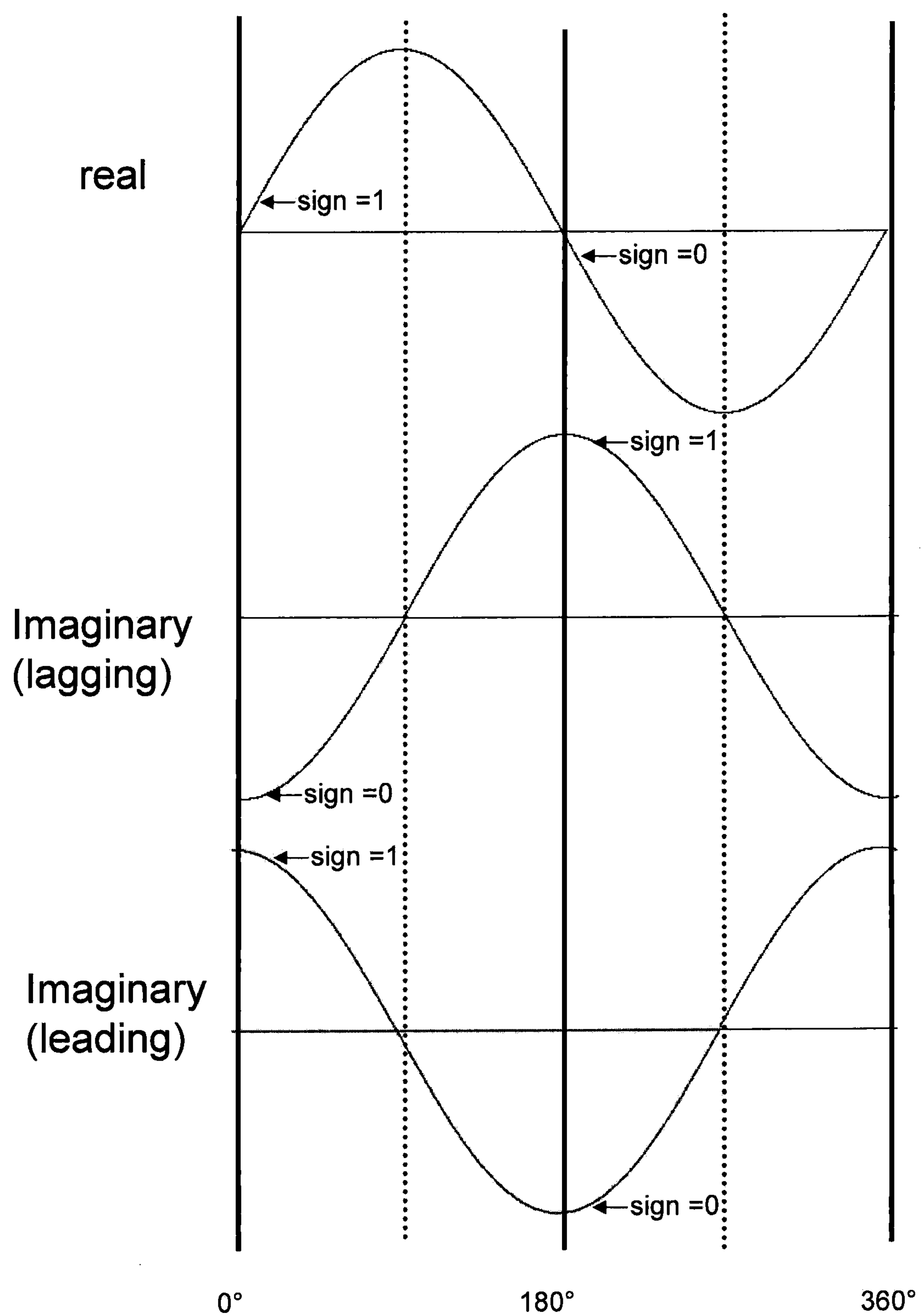
FIG. 5 shows plots of a real signal and leading and lagging imaginary signals.

This can be seen with reference to FIG. 5. Shortly after the real waveform crosses zero at zero degrees, its sign is positive (logic 1), and the imaginary waveform is negative (logic 0) when lagging and positive (logic 1) when leading. Shortly after the real waveform crosses zero (i.e., the x axis) at 180 degrees, its sign is negative (logic 0), and the imaginary waveform is positive (logic 1) when lagging and negative (logic 0) when leading. Thus, when the imaginary waveform lags the real waveform, their signs are opposite, whereas when the imaginary waveform leads the real waveform, their signs are the same. The exclusive-or of the sign of the real waveform data and the sign of the imaginary waveform data at a time shortly after a zero crossing (i.e., after the zero crossing but before ninety degrees) therefore indicates whether the imaginary waveform is leading or lagging the real waveform, which also indicates whether a logical 1 or a logical 0 of the code word is being transmitted at the time of the measurement. Those of skill in the art will recognize that the result will be exactly the opposite if the comparisons of the signs of the real and imaginary signals are made at the time that the imaginary signal crosses the x axis.

However, in some embodiments, a single bit of the code is transmitted for only approximately one half period of the difference frequency in order to obtain a high data rate (the period of time corresponding to one bit of the code shall be referred to herein as the symbol period). Moreover, as discussed above, there are frequency drifts between the oscillators in the receiver and transmitter. Due to these facts and the phase shift phenomenon discussed above, it is possible for either the real or imaginary signal to take on the appearance of a full wave rectified sinusoidal signal in which no zero crossing occurs for periods of time in which successive data bits (i.e., symbols) are oscillating between a 1 and a 0. This is because the transmitted frequency is shifting up or down, and therefore the phase is shifting by 180 degrees, on each successive bit, which is a half period of the difference frequency. This phenomenon can take on the appearance of a beat frequency that shifts slowly back and forth between the two waveforms as a function of the frequency drift between the transmitter and receiver oscillators.

However, when no zero crossing on one of the two signals occurs, a zero crossing will necessarily occur for the other signal because of the 90 degree phase difference between them. Thus, the phase-to-bit processing algorithm below selects between the real and imaginary waveforms in order to overcome the problem of no zero crossings on one or the other of those waveforms.

A pseudo code implementation for an exemplary phase to bit processing algorithm is shown below, along with explanatory comments.

TABLE 2

| Pseudo-Code Variables | | | |
|---|---|---|---|
| Title | Values | Use | Initialization |
| Real | 0, 1 | Sign bit only | 0 |
| Imag | 0, 1 | Sign bit only | 0 |
| RealCount | 1 thru 1601 | Number of samples, which is proportional to time, since a sign transition for the real waveform (i.e., time since a zero crossing of the real, or in-phase, signal). 1600 is between $\frac{3}{4}$ and 1 full symbol period, which is slightly less than one half of the difference frequency period. | 1 |
| ImagCount | 1 thru 1601 | Number of samples, which is proportional to time, since a sign transition for the imaginary waveform (i.e., time since a zero crossing of the imaginary signal). | 1 |
| PhaseRef | −1, 0, 1 | reference for edge detection (i.e. Real or Imag) | 0 |
| DataCount | 1 thru 2049 | 2049 is the number of samples in a data period | 0 |
| BitPointer | 1 through 16 | Bit pointer for code register | 1 |
| Data | 0, 1 | XOR of Real/Imag sign bits | 0 |
| CodeRegister | 16 bit register | HW to SW interface | 0000 0000 0000 0000 |

```
if sign(Real) <> sign(Real[t−1])                 // if there has been a zero crossing of the real signal
      Data    = sign(Real) XOR sign(Imag)         // set Data to XOR of the real and imaginary signals
      RealCount = 1                               // reset real zero crossing timer
elseif RealCount > 1600 AND RealCount > ImagCount
                                                  // else if no zero crossing of real signal
                                                  // over most of period
      PhaseRef = 1                                // set PhaseRef to select imaginary signal data
else
   RealCount = RealCount + 1                      // otherwise, increment real zero crossing timer
endif
if sign(Imag) <> sign(Imag[t−1])                  // if there has been a zero crossing of the imag signal
      Data = NOT [ sign(Real) XOR sign(Imag) ]    // set data to negative of XOR of real and imag signals
      ImagCount = 1                               // reset imaginary zero crossing timer
elseif ImagCount > 1600 AND ImagCount > RealCount
                                                  // if no zero crossing of imag signal over most of period
      PhaseRef = −1                               // PhaseRef to select real signal data
else
   ImagCount = ImagCount + 1                      // increment imaginary zero crossing timer
endif
if PhaseRef >= 0
   Data = Imag Data                               // select imaginary signal data
else
   Data = RealData                                // select real signal data
end
```

TABLE 2-continued

| Pseudo-Code Variables | |
|---|---|
| if ImagCount = 1 AND PhaseRef >= 0 | // if the imaginary signal has just been used to // determine the value of data bit for this period |
| DataCount = 0 | //reset the data counter |
| elseif RealCount = 1 AND PhaseRef <= 0 | //else if the real signal has just been used to // determine the value of data bit for this period |
| DataCount = 0 | //reset the data counter |
| elseif DataCount > 2047 | // if the full data period has run |
| DataCount = 0 | // reset the counter |
| else | |
| DataCount = DataCount + 1 | //else increment the data counter |
| endif | |
| if PhaseRef <> 0 AND DataCount = 0 | // If either the real or imaginary signal has been // selected and one of them has just been used to // determine the bit value |
| CodeRegister(BitPointer) = Data | // take the data and shift it into circular buffer |
| BitPointer = BitPointer + 1 | //increment the bit pointer |
| if BitPointer > 16 | //the code register is 16 bits long |
| BitPointer = 1 | //reset the bit pointer if at the 16th bit |
| endif | |
| endif | |

In addition to the phase to bit processing described above, the received signals undergo magnitude processing in which the magnitude of the signals is compared to a calibrated reference signal to determine the presence or absence (and, in some cases, distance) of a train. This processing is beyond the scope of the present application and will not be discussed in further detail herein to avoid obscuring the invention.

As disclosed in co-pending U.S. Provisional Application Ser. No. 61/226,416, entitled “Track Circuit Communications” (the entire content of which is hereby incorporated herein by reference), these codes can also be used to transmit information in addition to the codes or during periods when the codes are not being transmitted. For example, if there were 32,768 possible codes (i.e., an 8 bit code word were to be used), then two or more of the distinct code words could be assigned to each transmitter/receiver pair. In the event that two code words were assigned, the transmitter would transmit one of the two distinct codes for a logic “1” and the other of the two codes for a logic “0”. The receiver would be configured to interpret the reception of either of the two codes (or their amplitudes) as evidence of absence of a train in the track block, and would also interpret the received codes as symbols representing bits of data, thereby enabling data transmission using the tracks as the transmission medium. Those of skill in the art will recognize that the baud rate depends on the number of unique codes assigned to a receiver/transmitter pair (i.e., if 4 unique codes are assigned, then each 16 bit code word can represent two data bits, etc.). Alternatively, as discussed above, the transmitter could be configured to transmit a unique code assigned to a receiver/transmitter pair at some periodic rate (e.g., once per minute) and transmit data between the code transmissions. This is possible because the track condition is typically fairly static (and so the need to confirm that received transmissions originate from the correct transmitter is not that time-critical) and because the amplitude of the received transmission of any signal (whether data or code) can be used to detect the presence or absence of a train.

What is claimed is:

1. A method for processing a frequency shift key signal comprising the steps of:

mixing the frequency shift key signal with in-phase and quadrature components of a signal at a nominal center frequency corresponding to the frequency shift key signal to produce a mixed in-phase component and a mixed quadrature component;

filtering mixed in-phase component and the mixed quadrature component to produce a difference in-phase component and a difference quadrature component; and ascertaining a logical symbol indicated by the frequency shift key signal at a point in time by determining whether the difference in-phase component leads or lags the difference quadrature component at the point in time, wherein the determining comprises:

monitoring both the difference in-phase component and the difference quadrature component to detect a zero crossing of one of the difference in-phase component and the difference quadrature component;

performing an exclusive-or operation on a sign of the difference in-phase component and a sign of the difference quadrature component at a point in time that is within the interval between the zero crossing detected in the detecting step and one fourth of a period of the component for which the zero crossing is detected in the detecting step;

when the zero crossing is detected for the difference in-phase component, ascertaining the logical symbol directly and solely from the result of the exclusive-or operation on the sign of the difference in-phase component and the sign of the difference quadrature component without calculating a negative of the exclusive-or of the sign of the difference in-phase component and the difference quadrature component; and when the zero crossing is detected for the difference quadrature component, calculating a negative of the exclusive-or of the sign of the difference in-phase component and the difference quadrature component and ascertaining the logical symbol directly from the negative of the result of the exclusive-or operation on the sign of the difference in-phase component and the sign of the difference quadrature component.

2. The method of claim 1, wherein the determining step is repeated for a plurality of points in time.

3. The method of claim 1, wherein the component for which the zero crossing is detected is the difference in-phase component.

4. The method of claim 1, wherein the component for which the zero crossing is detected is the difference quadrature component.

5. A system for processing a frequency shift key signal comprising:

a first mixer for mixing the frequency shift key signal with an in-phase component of a signal at a nominal center frequency corresponding to the frequency shift key signal to produce a mixed in-phase component;

a second mixer for mixing the frequency shift key signal with a quadrature component of a signal at a nominal center frequency corresponding to the frequency shift key signal to produce a mixed quadrature component;

a filter circuit operable to input an output from the first mixer and the second mixer, the filter circuit being operable to filter the mixed in-phase component and the mixed quadrature component to produce a difference in-phase component and a difference quadrature component; and a logic unit connected to the filter circuit, the logic unit being configured to ascertain a logical symbol indicated by the frequency shift key signal at a point in time by determining whether the difference in-phase component leads or lags the difference quadrature component at the point in time, wherein the logic unit is configured to perform the determining by:

monitoring both the difference in-phase component and the difference quadrature component to detect a zero crossing of one of the difference in-phase component and the difference quadrature component;

performing an exclusive-or operation on a sign of the difference in-phase component and a sign of the difference quadrature component at a point in time that is within the interval between the zero crossing detected in the detecting step and one fourth of a period of the component for which the zero crossing is detected in the detecting step;

when the zero crossing is detected for the difference in-phase component, ascertaining the logical symbol directly and solely from the result of the exclusive-or operation on the sign of the difference in-phase component and the sign of the difference quadrature component without calculating a negative of the exclusive-or of the sign of the difference in-phase component and the difference quadrature component; and when the zero crossing is detected for the difference quadrature component, calculating a negative of the exclusive-or of the sign of the difference in-phase component and the difference quadrature component and ascertaining the logical symbol directly from the negative of the result of the exclusive-or operation on the sign of the difference in-phase component and the sign of the difference quadrature component.

6. The system of claim 5, wherein the logic unit is a microprocessor.

7. The system of claim 5, in which the filter circuit comprises a finite impulse response filter that processes both the mixed in-phase component and the mixed quadrature component.

8. The system of claim 5, further comprising an analog-digital-converter operable to input an analog frequency shift key signal and output digitized samples of the frequency shift key signal to the mixers.

9. The system of claim 8, further comprising a numerically controlled oscillator connected to the mixers and configured to generate a signal at a nominal center frequency corresponding to the frequency shift key signal.

10. The system of claim 5, wherein the determining step is repeated for a plurality of points in time.

11. The system of claim 5, wherein the component for which the zero crossing is detected is the difference in-phase component.

12. The system of claim 5, wherein the component for which the zero crossing is detected is the difference quadrature component.

* * * * *